US008647062B2

(12) United States Patent
Soucheleau

(10) Patent No.: US 8,647,062 B2
(45) Date of Patent: Feb. 11, 2014

(54) METHOD AND DEVICE FOR IMPROVING PERFORMANCES OF AN AIRCRAFT COMPRISING AT LEAST ONE PROPELLER ENGINE WITHOUT PROPELLER FAIRING

(75) Inventor: Bertrand Soucheleau, Toulouse (FR)

(73) Assignee: Airbus Operations (SAS), Toulouse Cedex (FR)

( * ) Notice: Subject to any disclaimer, the term of this patent is extended or adjusted under 35 U.S.C. 154(b) by 590 days.

(21) Appl. No.: 13/030,312

(22) Filed: Feb. 18, 2011

(65) Prior Publication Data
US 2011/0206508 A1    Aug. 25, 2011

(30) Foreign Application Priority Data

Feb. 23, 2010  (FR) ...................................... 10 00732

(51) Int. Cl.
*B64C 11/30*   (2006.01)
(52) U.S. Cl.
USPC ........................................................... 416/27
(58) Field of Classification Search
None
See application file for complete search history.

(56) References Cited

U.S. PATENT DOCUMENTS 2,645,294 A   7/1953  Douthett
2,919,752 A   1/1960  Brandes et al.

FOREIGN PATENT DOCUMENTS

GB         596971     1/1948
GB        2406884     4/2005

OTHER PUBLICATIONS

French Republic Institut National, Preliminary Search Report (English Language 2 pgs., French Language 2 pgs), Oct. 13, 2010.

*Primary Examiner* — Nathaniel Wiehe
*Assistant Examiner* — Jeffrey A Brownson
(74) *Attorney, Agent, or Firm* — Wood, Herron & Evans, LLP

(57) ABSTRACT

A device for improving performance of an aircraft with a propeller includes a constant torque blade setting device that slaves, automatically and independently, blade setting angles, respectively associated with blades of the propeller, to a constant reference control moment predetermined, for a desired propeller thrust value. The blade setting angles are intended to be applied on each blade such that torsion aerodynamic moments applied on blades stay roughly equal to the reference control moment regardless of the angular position of blades in the propeller plane. A corresponding method for improving performance of an aircraft includes the use of the constant torque blade setting device to slave blade setting angles to a constant reference control moment.

11 Claims, 3 Drawing Sheets

METHOD AND DEVICE FOR IMPROVING PERFORMANCES OF AN AIRCRAFT COMPRISING AT LEAST ONE PROPELLER ENGINE WITHOUT PROPELLER FAIRING

TECHNICAL FIELD

The present invention relates to a method and a device for improving performance of an aircraft comprising at least one engine provided with a propeller without fairing, as well as an engine comprising such a device.

BACKGROUND

Although the present invention is particularly well adapted for turboprops of a civil or military airplane, without propeller fairing, it is in no way limited to this latter application.

It is known that turboprops without propeller fairing of an airplane, in addition to the thrust component, apply normal stresses to the rotation axis of the propeller, contrary to airplane turbojets. Such normal stresses, commonly referred to as loads 1P in the aeronautical language, occur when the air flow upstream the propeller of turboprops has a not nil incidence with respect to the rotation axis of the propeller (the air aerodynamic speed vector is not co-linear to said rotation axis). They may be very important (for example several times higher than the thrust stresses) depending on the flight phase and the configuration of the airplane.

It is further known that the propeller incidence and sideslip of an airplane turboprop, as well as the speed of the airplane, are parameters impacting on the intensity of loads 1P. In particular, the higher the incidence and the speed, the more important the ratio of the loads 1P produced on the thrust as developed by the propeller.

Thus, the loads 1P could be assimilated to the work of an airplane aerofoil and, depending of the flight phases and the configuration of the latter, become added or, on the contrary, disturb the work of the other aerofoils of the airplane (aerofoil, horizontal stabilizer, vertical stabilizer). Therefore the effect of the loads 1P impacts:
- on the controllability and the stability of the airplane. Depending on the configuration of the airplane and the flight phase, the loads 1P could be either stabilizing, in which case the maneuverability of the airplane is reduced, or destabilizing, in which case they should be counteracted so as to restore an acceptable behaviour of the airplane. Any way, this results in the stabilization and control surfaces being increased so as to counteract such stresses;
- on the performance of the airplane. The indispensable increase of the stabilization and control surfaces generates an additional drag. Furthermore, for stabilizing the airplane, it is sometimes necessary to provide an antagonistic work to that developed by loads 1P, leading in an additional loss of energy; and
- on the mass of the airplane. The structure of the airplane is sized so as to withstand such high loads 1P while the latter do not produce any useful work for the airplane mission.

SUMMARY OF THE INVENTION

The aim of the present invention is to overcome such drawbacks, and, more specifically, to decrease, even cancel completely, the loads 1P being applied on aircraft engines without propeller fairing.

To this end, according to this invention, the method for improving performance of an aircraft comprising at least one engine provided at least one propeller without fairing, said propeller comprising a plurality of blades evenly distributed around a rotation axis and able to rotate in a rotation plane orthogonal to said rotation axis, with each one of said blades being associated a setting angle formed by the chord of a section of said blade corresponding to a determined distance from the rotation axis and said plane of rotation, each one of said blades being submitted to one torsion aerodynamic moment, is remarkable in that it comprises the following steps consisting in:
- determining preliminarily, for a desired thrust value of said propeller, a constant reference control torsion moment, intended to be applied on each one of said blades; and
- automatically and independently slaving the setting angles being respectively associated with said blades, to said determined reference control moment, so that said torsion aerodynamic moments apply on said blades stay substantially equal to said reference control moment whatever the angular position of the latter in said plane of rotation.

Thus, thanks to this invention, adjusting the setting of each one of the blades, the torsion aerodynamic moment applied on each one of them stays substantially constant, for removing the alternated strains usually undergone by the propeller blades. Thereby, the structural fatigue of the propeller is decreased, while increasing its performance over time. Additionally, when cancelling, or at least, reducing the loads 1P:
- the energy dissipations are limited, so that the propulsive yield of the propeller (and thus of the engine) is improved; and
- the stabilization and control surfaces can be reduced, allowing for the mass of the aircraft to be reduced.

Furthermore, thanks to this invention, it is possible to reduce the sound signature being generated by varying the aerodynamic load of the blades of the propeller.

Moreover, said reference control moment can be advantageously adjusted during the flight of said aircraft so as to modify the thrust applied by the propeller of said engine.

Additionally, this invention relates to a method for improving performance of an aircraft comprising at least one engine provided at least with a propeller without fairing, said propeller comprising a plurality of blades evenly distributed around a rotation axis and able to rotate in a plane of rotation orthogonal to said rotation axis, with each one of said blades being associated a blade setting angle formed by the chord of a section of said blade corresponding to a determined distance from the rotation axis and said plane of rotation, each one of said blades being submitted to a torsion aerodynamic moment, According to the invention, said device comprises means for slaving, automatically and independently, the blade setting angles, respectively associated with said blades, to a predetermined constant reference control moment, for a desired thrust value of said propeller, and intended to be applied on each one of said blades, such that said torsion aerodynamic moments applied on said blades stay substantially equal to said reference control moment whatever the angular position of the latter in said plane of rotation.

In a particular embodiment according to the invention:
- with each one of said blades, there are associated individual slaving means; and
- said individual slaving means have the form of constant torque setting means developing said predetermined reference control moment.

Thus, the constant torque setting means associated with each of the blades of a propeller allow the torsion aerodynamic moment of the blades to be substantially equal to the constant reference control moment.

Moreover, in such a particular embodiment:

said constant torque setting means associated with each one of said blades can comprise at least one hydraulic jack provided with a body wherein a plunger moves, being fixed to a stem which is connected to said corresponding blade; and said jack can be supplied by a fluid, having its supply pressure being predetermined, and could comprise at least one valve allowing for the stabilization of the pressure inside said jack, so that the latter is lower than said supply pressure.

Preferably said valve is provided with a settable calibration so as to allow, if appropriate, for the adjustment of said reference control moment during the flight of said aircraft.

This invention further relates to an aircraft engine of the type comprising at least one propeller without fairing, said propeller comprising a plurality of blades evenly distributed around a rotation axis and able to rotate in a plane of rotation orthogonal to said rotation axis, with each one of said blades there is being associated a setting angle formed by the chord of a section of said blade corresponding to a determined distance from the rotation axis and said plane of rotation, each one of said blades being additionally submitted to a torsion aerodynamic moment. According to this invention, said engine comprises at least one device of the above described type.

Furthermore, this invention also relates to an aircraft comprising at least one propeller engine without propeller fairing as mentioned hereinabove.

BRIEF DESCRIPTION OF THE DRAWINGS

The FIGS. of the appended drawing will better explain how this invention can be implemented. In these FIGS., like reference numerals relate to like components.

DETAILED DESCRIPTION

Figure 1:
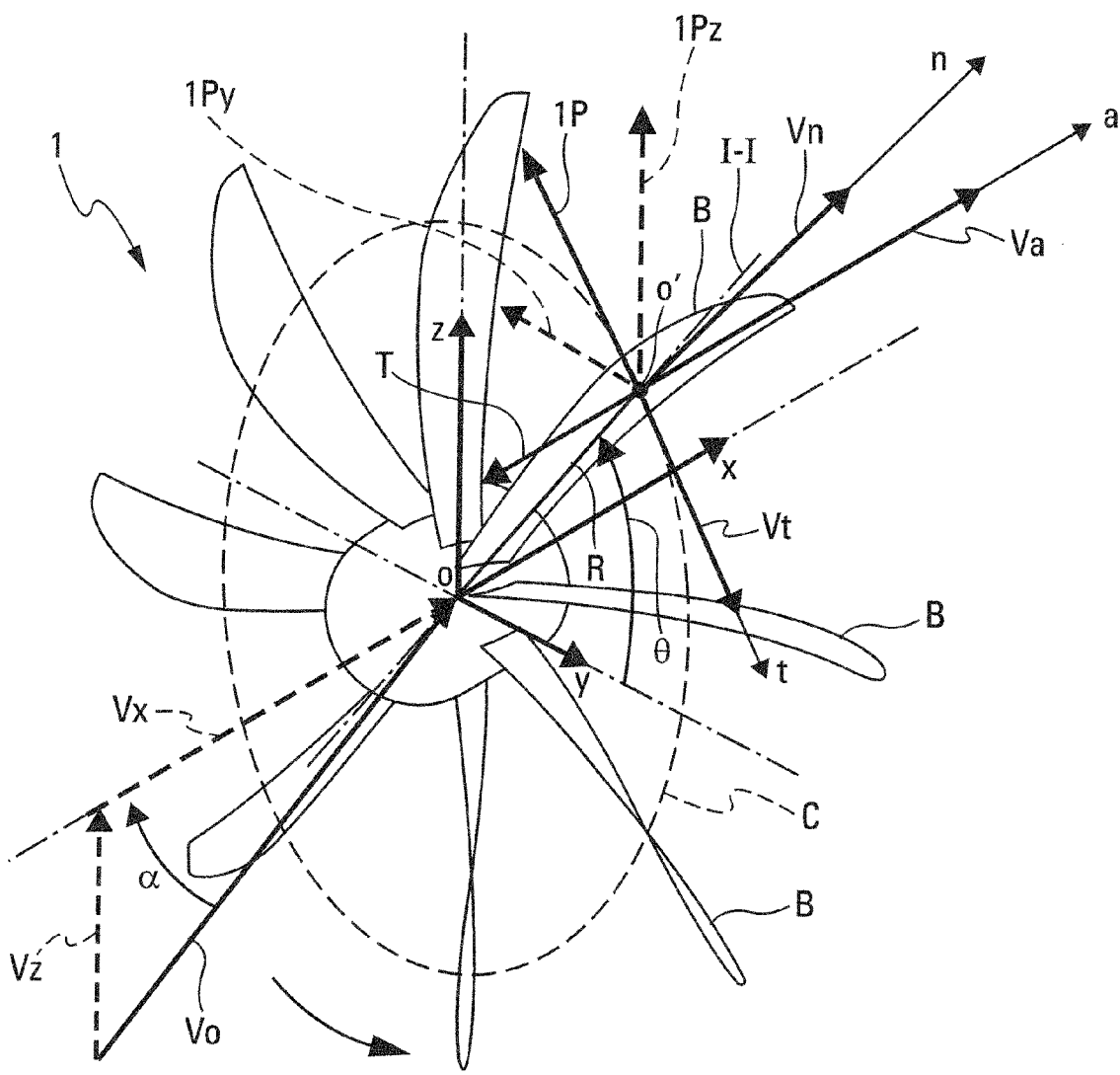
FIGS. 1 and 2 represent, in a front perspective schematic view, a known propeller of an airplane engine without fairing.

On FIG. 1, there is shown, schematically, a known airplane engine propeller without fairing 1. It comprises a plurality of blades B, being distributed in an equiangular manner around a rotation axis, being intended for rotating in a plane of rotation orthogonal to the rotation axis.

An orthonormal reference point is defined (O,x,y,z) wherein the axis Ox is confused with the rotation axis of the propeller 1 and the axes Oy and Ox belong to the plane of rotation (x,O,y) of the propeller 1, being orthogonal to the rotation axis Ox.

In the remainder of the description, any blade B of the propeller 1 is considered, the median axis I-I of the blade B crossing the point O and forming an angle $\theta$ with the axis Oy, $\theta$ being subsequently referred to as the angular position.

It is assumed that the propeller 1 rotates at the angular speed $\omega$, so that the following relationship is obtained: $\theta = \omega t$, wherein t corresponds to the time.

Additionally, the following is considered:

a point O' of the blade B belonging to the median axis I-I thereof and located at a distance R from the centre O;

an upstream aerodynamic air flow of incidence $\alpha$ with respect to the rotation axis of the propeller 1, with which an aerodynamic speed vector is associated with respect to the propeller 1 of a modulus equal to Vo.

In the plane (x,O,z), such an aerodynamic speed vector is distributed in the following way:

according to Ox, $Vx = Vo \cdot \cos(\alpha)$; and according to Oz, $Vz = Vo \cdot \sin(\alpha)$.

An orthogonal local reference point (O',a,t,n) is defined, being associated with the blade B for an angular position $\theta$, such as:

$$O'a = Ox;$$

$$O'n = Oy \cdot \cos(\theta) + Oz \cdot \sin(\theta); \text{ and}$$

$$O't = Oy \cdot \sin(\theta) - Oz \cdot \cos(\theta).$$

At this local reference point (O',a,t,n), the flow speed vector is then distributed as follows:

according to O'a, $Va = Vo \cdot \cos(\alpha)$, Va being the forwarding speed;

according to O'n, $Vn = Vo \cdot \sin(\alpha) \cdot \sin(\theta)$, Vn being the normal speed component; and according to O't, $Vt = -R\omega - Vo \cdot \sin(\alpha) \cdot \cos(\theta)$, Vt being the tangent speed component linked to the rotation of the propeller 1.

The aerodynamic incidence $\alpha_{eff}$ of the blade B is defined as a function of the forwarding speed vector Va and the tangent speed component Vt linked to the rotation of the propeller 1. It is dependent on the angular position $\theta$ of the blade B. The latter therefore undergoes, upon its rotation, a variation of aerodynamic incidence, so that the thrust T and drag D forces it generates also vary.

At the angular position $\theta$, the loads 1P associated with the blade B develop as a function of the tangent Ot of the rotation circle C of the propeller 1 (with a centre O, crossing O', and a radius R), so that, in the plane of rotation (y,O,z), they are distributed as follows:

according to Oy, $1Py = 1P \cdot \sin(\theta)$, where 1P is the modulus of the tangent loads 1P of the blade B; and according to Oz, $1Pz = 1P \cdot \cos(\theta)$.

The thrust force T of the blade B at the angular position $\theta$ is, as far as it is concerned, normal to the plane of rotation (y,O,z) and therefore co-linear to the axis Ox.

Figure 2:
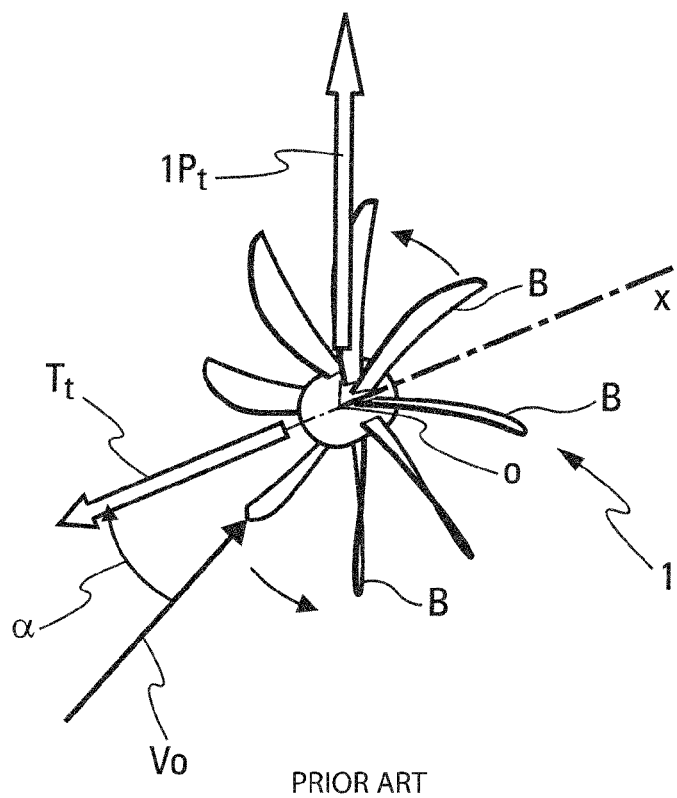

Thus, as the previous analysis shows, if there is no identity of the tangent loads 1P for the angular positions $\theta$ and $\theta+180°$ of the blade B, then the integration of the components 1Py and 1Pz upon a propeller revolution is not nil. In this latter case, there appears a total resultant 1Pt of the loads 1P associated with the propeller 1 in the plane of rotation (x,O,y) as shown on FIG. 2 (Tt representing the total resultant of the thrust forces T of the blades B of the propeller 1).

Figure 3:
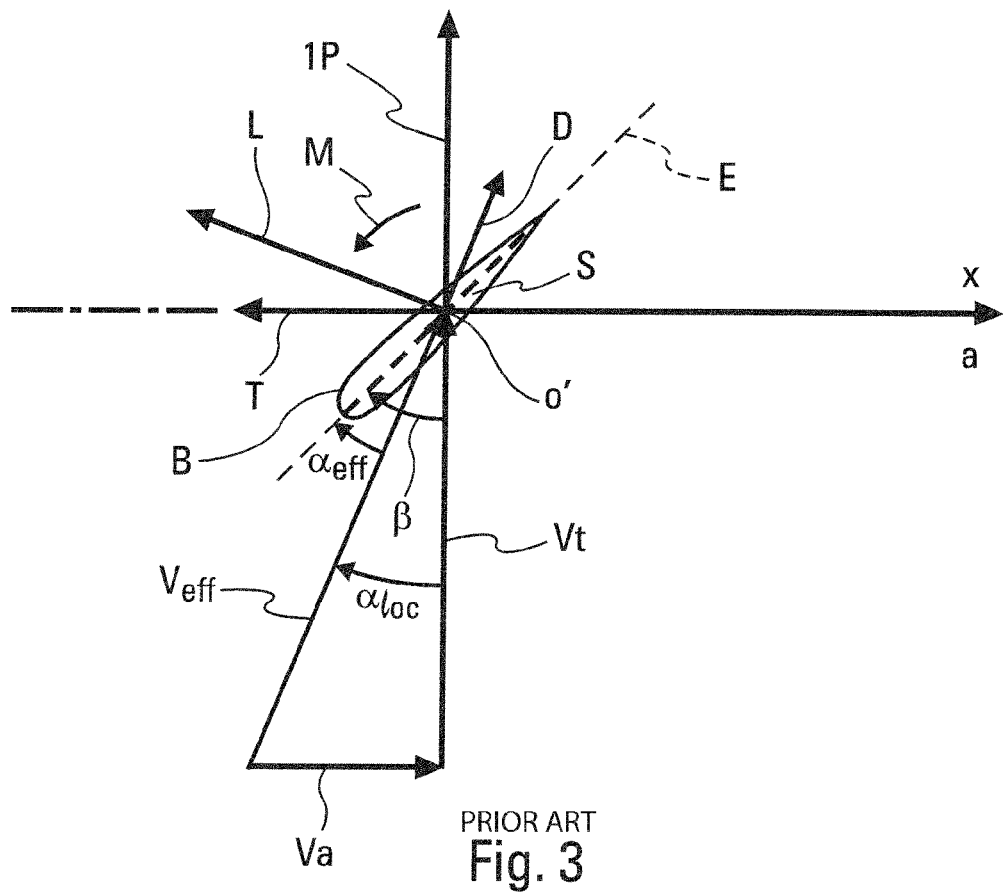
FIG. 3 is a schematic cross-sectional view of one of the blades of the propeller of FIG. 1.

On FIG. 3 are represented the aerodynamic loads being applied on the profile of the blade B, at the level of a section S of the latter at a distance R from the rotation axis Ox.

A local geometrical angle is defined $\alpha_{loc}$, such that $\alpha_{loc} = \arctan(Va/Vt)$. The aerodynamic incidence $\alpha_{eff}$ of the blade B is characterized by the following relationship: $\alpha_{eff} = \beta - \alpha_{loc}$, wherein $\beta$ is the blade setting angle formed by the chord of the section S of the blade B and the plane of rotation (y,O,z).

Replacing the components Vt and Va by the previously obtained expressions, the following relationship is obtained for the aerodynamic incidence:

$$\alpha_{\mathit{eff}} = \beta - \arctan\left[\frac{-Vo \cdot \cos(\alpha)}{R\omega + Vo \cdot \sin(\alpha) \cdot \cos(\theta)}\right]$$

At a reference point carried by the aerodynamic speed vector $V_{\mathit{eff}}$ of the air flow with respect to the blade B, the lift L, the drag D and the torsion aerodynamic moment M of the blade B can be modelled as follows:

$$L = K_l \cdot \alpha_{\mathit{eff}}$$

$$D = K_d \cdot L^2 = K_d \cdot (K_l \cdot \alpha_{\mathit{eff}})^2$$

$$M = K_m \cdot L = K_m \cdot K_l \cdot \alpha_{\mathit{eff}}$$

wherein $K_l$, $K_d$ and $K_m$ are first approximation constants.

The following expressions are thereby obtained for the thrust force T and the tangent loads 1P applied on the blade B:

$$T = L \cdot \cos(\alpha_{loc}) - D \cdot \sin(\alpha_{loc})$$

$$1P = L \cdot \sin(\alpha_{loc}) + D \cdot \cos(\alpha_{loc})$$

It can be seen from the above modelled expressions that the aerodynamic incidence $\alpha_{\mathit{eff}}$ is dependent on the following parameters:
the incidence $\alpha$;
the blade setting angle $\beta$;
the angular position $\theta$; and
the angular speed $\omega$ of the propeller 1.

In particular, the dependence on the angular position $\theta$ creates a variation of the aerodynamic incidence $\alpha_{\mathit{eff}}$ during one revolution of the propeller 1. Such a variation results in an oscillation of the lift L, of the drag D and of the moment M and, consequently, an oscillation of the components of the thrust force T and of the tangent loads 1P associated with the blade B.

It could additionally be noticed that, as soon as the incidence $\alpha$ is not nil, the aerodynamic incidence $\alpha_{\mathit{eff}}$ is no longer symmetric, that is) $\alpha_{\mathit{eff}}(\theta+180°) \ne \alpha_{\mathit{eff}}(\theta)$. As a result, $1P(\theta+180°) \ne 1P(\theta)$. The integration of the components 1Py and 1Pz upon a revolution of the blade B is then not nil, resulting in the occurrence of the above mentioned drawbacks (controllability and stability problems for the airplane, damaged performance, increased mass).

The present invention therefore consists in providing the constancy of the loads 1P developed by each one of the blades B of the propeller 1 during a revolution, so as to cancel the total resultant 1Pt of the loads 1P (and therefore, the total resultant of the components 1Py and 1Pz) of all the blades B upon one propeller revolution 1.

To this end, according to this invention, preliminarily, experimentally and/or through simulation, a reference control torsion moment Mc is determined for being applied on each one of the blades B of the propeller 1 for a desired thrust value of the propeller 1, then, automatically and independently, the blade setting angles $\beta$, are slaved respectively associated with said blades B, to the determined reference control moment Mc, so that the torsion aerodynamic moments M applied on said blades B stay substantially constant whatever the angular position $\theta$ of the latter in the plane of rotation (y,O,z).

Thus, the aerodynamic incidence $\alpha_{\mathit{eff}}$ and thus, the aerodynamic stresses L, D and M respectively associated are constant. In other words, a differentiated adaptation of the blade setting angle is achieved for each one of the blades B of the propeller 1, independently from the other blades B, by means of a blade setting device 10.

As previously noticed, the torsion aerodynamic moment M applied on a blade B is proportional to the lift of the blade L and the drag D depends on L. Thus, if the torsion moment M is constant, then the associated lift L and drag D are constant whatever the angular position of the blade B is, similarly to the loads 1P. The resultants of the components 1Pz and 1Py are then nil upon one propeller revolution.

Furthermore, the reference control moment Mc could be adjusted during a flight of the airplane so as to adapt the thrust of the propeller to the flight phase.

Figure 4:
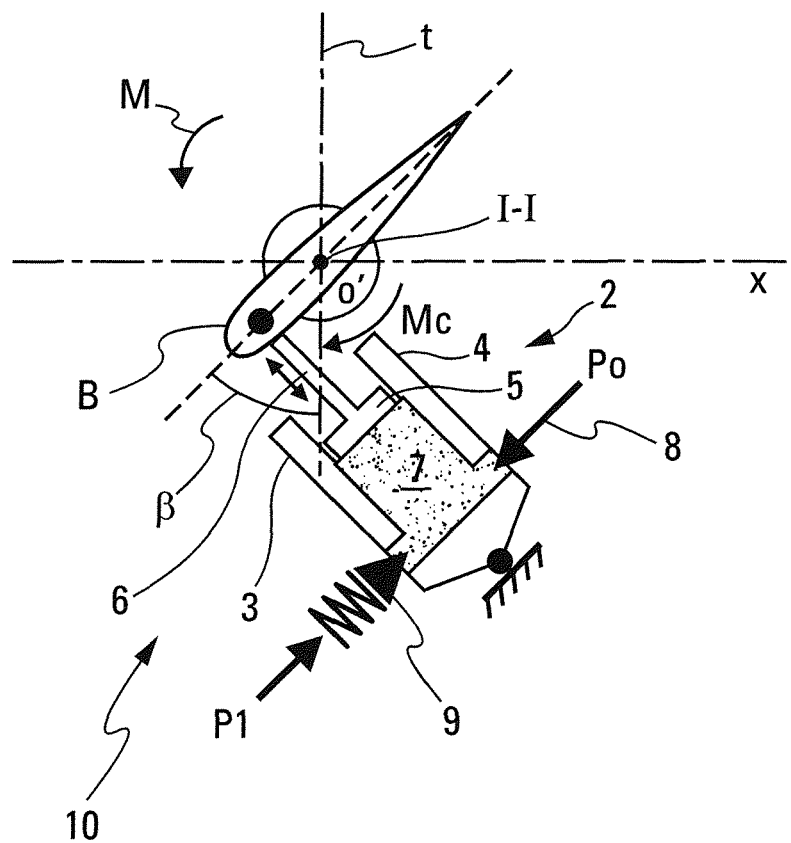
FIG. 4 is similar to FIG. 3, except that the blade of the propeller is provided with individual slaving means for its blade setting angle, according to the present invention.

On FIG. 4, are schematically represented individual means 2, according to this invention, for automatically slaving the setting angles $\beta$ of the blades B, to the predetermined reference control moment Mc, so that the torsion aerodynamic moment M applied on the blade B stays substantially constant whatever the angular position $\theta$ of the latter is in the plane of rotation (x,O,y) and equal to the reference control moment Mc. Each one of the blades B of the propeller 1 comprises such individual slaving means 2 for the blade setting angle $\beta$, so that the blade setting device 10 of this invention (partially shown on FIG. 4) comprises as many means 2 as blades B. The individual slaving means 2 associated with the blades B are independent one from the others and are, at least in part, integrally mounted with the propeller 1. Thus, slaving the blade setting angle $\beta$ of each one of the blades B of the propeller 1 is thus independently achieved from that of the other blades B.

According to the invention, in a particular embodiment, such individual slaving means 2 have the form of a constant torque blade setting device 2.

In the example of FIG. 4, the constant torque blade setting device 2, associated with the illustrated blade B, comprises a hydraulic jack 3 provided with a cylindrical body 4 wherein a plunger 5 moves being fixed to a stem 6, in turn connected to said blade B. The compression chamber 7 of the jack 3 formed by the body 4 and the plunger 5 are supplied by a fluid (shown with the arrow 8), having its supply pressure being predetermined and equal to Po.

Additionally, the hydraulic jack 3 comprises, on its body 4, at least one valve 9 provided with a settable calibration so as to allow for the stabilization of the pressure within the compression chamber 7 at a predetermined value P1, so that the latter permanently stays lower than the supply pressure Po. Setting the valve additionally allows the reference control moment Mc to be adjusted during the flight of the airplane.

Thus, each blade B is controlled by a hydraulic jack 3, the motion of its plunger 5 generating, by means of a stem 6, a variation of the setting $\beta$ of the blade B being considered. The hydraulic jack 3 applies on the blade B a predetermined constant reference control moment Mc opposing to the torsion aerodynamic moment M resulting from the aerodynamic stresses applied on the blade B.

In particular, the torsion aerodynamic moment M is proportional to the blade setting angle $\beta$. If the angle $\beta$ increases, then the moment M increases and inversely. By design, the reference control moment Mc being constant, if during the rotation of the propeller 1 the intensity of the aerodynamic stresses applied on a blade B progresses, the setting of the blade B being considered becomes spontaneously adjusted so as to cancel such a development. A slaving of the setting angle of the blade B is then achieved.

Thus, when the torsion moment M of the blade B tends to decrease, the jack 3 applies an antagonistic force for holding the torsion moment M equal to the reference control moment Mc of the jack 3. This then leads to an increase of the blade setting angle $\beta$ (the stem 6 of the jack 3 comes out of the body 4).

On the other hand, when the torsion moment M of the blade B tends to increase, the jack 3 applies again an antagonistic force intended for holding the torsion moment M equal to the reference control moment Mc, resulting in a decrease of the blade setting angle β (the stem 6 of the jack 3 comes into the body 4 compressing the fluid that then escapes through the valve 9).

The exemplary embodiment of the constant torque blade setting means has been merely presented as an illustration and is by no means limiting.

The invention claimed is:

1. A method for improving performance of an aircraft comprising at least one engine provided at least with one propeller without fairing (1), the propeller (1) comprising a plurality of blades (B) evenly distributed around a rotation axis (Ox) and able to rotate in a plane of rotation orthogonal to the rotation axis (Ox), with each one of the blades (B) being associated a blade setting angle (β) formed by the chord (E) of a section (S) of the blade (B) corresponding to a determined distance (R) from the rotation axis and the plane of rotation, each one of the blades (B) being submitted to a torsion aerodynamic moment (M), the method comprising:
    preliminarily determining for a desired thrust value of the propeller (1), a constant reference control torsion moment (Mc), intended to be applied on each one of the blades (B); and
    automatically and independently slaving, the blade setting angles (β) respectively associated with the blades (B), to the determined reference control moment (Mc), such that the torsion aerodynamic moments (M) applied on the blades (B) stay substantially equal to the reference control moment (Mc) whatever the angular position (θ) of the latter in the plane of rotation.

2. The method according to claim 1, wherein the reference control moment (Mc) is adjusted during a flight of the aircraft.

3. A device for improving performance of an aircraft comprising at least one engine provided with at least one propeller without fairing (1), said propeller (1) comprising a plurality of blades (B) evenly distributed around a rotation axis (Ox) and able to rotate in a plane of rotation orthogonal to said rotation axis (Ox), with each one of said blades (B) being associated a blade setting angle (β) formed by the chord (E) of a section (S) of said blade (B) corresponding to a determined distance (R) from the rotation axis and said plane of rotation, each one of said blades (B) being submitted to a torsion aerodynamic moment (M), wherein said device comprises:
    a constant torque blade setting device (2) that slaves, automatically and independently, the blade setting angles (β), respectively associated with said blades (B), to a predetermined constant reference control moment (Mc), for a desired thrust value of said propeller (1), and intended for being applied to each one of said blades (B), such that said torsion aerodynamic moments (M) are applied on said blades (B) stay substantially equal to said reference control moment (Mc) whatever the angular position (A) of the latter in said plane of rotation.

4. The device according to claim 3, wherein said constant torque blade setting device develops said predetermined reference control moment.

5. The device according to claim 4, wherein:
    said constant torque blade setting device (2) associated with each one of said blades (B) comprises at least one hydraulic jack (3) provided with a body (4) wherein a plunger (5) moves, fixed to a stem (6), being connected to said corresponding blade (B); and
    said jack (3) is supplied by a fluid, having the supply pressure (Po) being predetermined, and comprises at least one valve (9) allowing for the stabilization of the pressure (P1) within said jack (3), such that the pressure (P1) within said jack (3) is lower than said supply pressure (Po).

6. The device according to claim 5, wherein said valve (9) is provided with a settable calibration so as to allow for the adjustment of said reference control moment (Mc) during the flight of said aircraft.

7. An aircraft engine of the type comprising at least one propeller without fairing (1), said propeller (1) comprising a plurality of blades (B) evenly distributed around a rotation axis (Ox) and able to rotate in a plane of rotation orthogonal to said rotation axis (Ox), with each one of said blades (B) being associated a blade setting angle (β) formed by the chord (E) of a section (S) of said blade (B) corresponding to a determined distance (R) from the rotation axis and said plane of rotation, each one of said blades (B) being submitted to a torsion aerodynamic moment (M), said aircraft engine having at least one device (10) comprising:
    a constant torque blade setting device (2) that slaves, automatically and independently, the blade setting angles (β), respectively associated with said blades (B), to a predetermined constant reference control moment (Mc), for a desired thrust value of said propeller (1), and intended for being applied to each one of said blades (B), such that said torsion aerodynamic moments (M) are applied on said blades (B) stay substantially equal to said reference control moment (Mc) whatever the angular position (θ) of the latter in said plane of rotation.

8. An aircraft, comprising at least one aircraft engine provided with a propeller without fairing (1) such as specified in claim 7.

9. The aircraft engine according to claim 7, wherein said constant torque blade setting device develops said predetermined reference control moment.

10. The aircraft engine according to claim 9, wherein:
    said constant torque blade setting device (2) associated with each one of said blades (B) comprises at least one hydraulic jack (3) provided with a body (4) wherein a plunger (5) moves, fixed to a stem (6), being connected to said corresponding blade (B); and
    said jack (3) is supplied by a fluid, having the supply pressure (Po) being predetermined, and comprises at least one valve (9) allowing for the stabilization of the pressure (P1) within said jack (3), such that the pressure (P1) within said jack (3) is lower than said supply pressure (Po).

11. The aircraft engine according to claim 10, wherein said valve (9) is provided with a settable calibration so as to allow for the adjustment of said reference control moment (Mc) during the flight of said aircraft.

* * * * *